(12) United States Patent
Elberbaum (10) Patent No.: US 7,298,969 B2
(45) Date of Patent: Nov. 20, 2007

(54) HOUSING WITH CAMERA AND ILLUMINATOR FOR FENCE AND SECURITY OBSERVATION

(75) Inventor: David Elberbaum, Tokyo (JP)

(73) Assignee: Elbex Video Limited, Tokyo (JP)

( * ) Notice: Subject to any disclaimer, the term of this patent is extended or adjusted under 35 U.S.C. 154(b) by 220 days.

(21) Appl. No.: 11/000,779

(22) Filed: Dec. 1, 2004

(65) Prior Publication Data

US 2006/0115265 A1 Jun. 1, 2006

(51) Int. Cl.
*G03B 17/08* (2006.01)
*H04N 5/225* (2006.01)

(52) U.S. Cl. .................. 396/28; 396/427; 396/428; 348/373

(58) Field of Classification Search ............ 396/12, 396/25, 28, 175, 419, 427, 428; 362/152; 348/143, 159, 373–375; 352/242, 243
See application file for complete search history.

(56) References Cited

U.S. PATENT DOCUMENTS

2003/0093805 A1* 5/2003 Gin ............................ 725/105

2004/0119881 A1* 6/2004 Matko et al. ............... 348/375

* cited by examiner

Primary Examiner—W. B. Perkey
Assistant Examiner—Rishi S. Suthar
(74) Attorney, Agent, or Firm—Katten Muchin Rosenman LLP

(57) ABSTRACT

An upright camera housing having an adjustable pan position and an upright front pane for at least one camera with adjustable lens and tilt includes a mount for installing the housing onto a vertical structure and for attaching the mount to the housing by fasteners at the horizontal axis of the housing. An adjustable tilt is provided for the camera within the interior of said housing through a screw guided movable slider driven by first adjustment tool and linked to said at least one camera and wherein said adjustment tool is accessed through first sealed access of said housing. An adjustable lens is provided for each camera for manual adjustment and remote control adjustment. A manual adjustment is accessed by second adjustment tool through a second sealed access of the housing and the remote control adjustment being provided by one geared motor.

22 Claims, 10 Drawing Sheets

HOUSING WITH CAMERA AND ILLUMINATOR FOR FENCE AND SECURITY OBSERVATION

BACKGROUND OF THE INVENTION

1. Field of the Invention

This invention is related to closed circuit television and other observation cameras and their casing and to IR or other illuminators and their casings used for day-night observation of fences and other security installation.

2. Description of the Priort Art

Cameras for closed circuit television, network cameras and other digital cameras used for fence observation are mounted inside an outdoor housings on top of the fence's pole or post for observing the fence from top, whereby, the angle of view of the observed fence is determined by the lens, the height of the pole or post and the housing's vertical tilt and horizontal coordinates. Long fences, such as border fences between countries, are extended over mountains and valleys and are not structured in straight lines and the observation of the fences therefore, requires many compromises relating to the angle of view.

For example, the viewing of fence details calls for narrow-angle lens, which depicts the fence as a larger object onto the monitor screen, but which cuts portions of a fence section from the optical path of the camera and the viewed scene. On the other hand, the observation of a complete section of a fence such as between two poles calls for wider-angle lens, which depicts the fence on a monitor as a smaller object of a wider viewed area.

These two conflicting limitations, the observation of the fence details versus the observation of the entire section of a fence is a major compromise issue, whereby it calls for a consideration of giving up on fence details or allowing portion of the fence to be left unobserved.

Moreover, the lens' angle of view limitations are coupled with landscape limitations due to the terrain and the elevation of the poles or posts of the fence, as well as the bend sections or corners of a stretched fence, all of which greatly compels the positioning of the housing's tilt and pan coordinates in line with the landscape. This landscape limitation further inhibits or prevents altogether the viewing of a complete individual section between two poles of a given fence.

The unavoidable lens compromise and the positioning limitation of the housing pan-tilt coordinates, because of the landscape, regularly leaves portions of the fence uncovered by the surveillance cameras. These uncovered sections are known as blind stretches, blind sections or blind spots.

Further, camera and illuminator housings mounted on poles above the fence are prone to vandalism or destruction by intruders at distances far from the fence itself, thereby, increasing the risks of intruder defeating the fence observation system, particularly at night.

SUMMARY OF THE INVENTION

It is an object of the present invention to provide a camera system and illuminator system that are embedded inside or attached to the pole or post of a fence for observing the whole section of a fence without leaving blind spots between the two poles of the section.

A "fence section" in the following descriptions is a stretch of a fence between two adjacent fence poles.

"Poles" in the following description are poles, posts, columns, or pillars made of steel or any other metal, or wood, or concrete, or other solid material and are fabricated, or assembled, or cemented, or molded, or injected structure.

"Camera" in the following description is a color or black/white closed circuit television camera, or color or black/white Digital camera or color or black/white Web camera, mounted inside the one or more outdoor housing.

"IR" in the following description relates to InfraRed illumination spectrum or band longer than 700 nm and which is not visible to human eyes.

"IR camera" in the following description is a camera having no IR cut filter in its optical path, thereby enabling the camera to observe dark scenes exposed to IR illumination.

"Day-night camera" in the following description is a camera with built mechanism for removing and reinserting an IR cut filter from its optical path for enabling the camera to observe at night time dark scenes exposed to IR illumination and for observing day light scenes undisturbed by IR.

"B/W" in the following description refers to Black and White.

This and other objects of the present invention are attained by one or more outdoor housing for one or more camera and one or more illuminator with an adjustable tilting facilities for the camera and/or the illuminator within the housing interior and adjustable panning facilities for the housing within the confine of the pole interior. The one or more camera may be provided with a fixed focal length lens or with an adjustable zoom or varifocal lens that can be adjusted manually while the housing is mounted inside a pole or attached to the pole or remotely by using a remotely controlled motorized zoom or varifocal lens.

The housing may include day-night camera for switching over automatically or upon command from day light observation to dark scene observation, such as during night time, using IR illuminator.

Alternatively, two or more cameras can be included in the housing, such as color camera, B/W camera and IR camera with the cameras being connected to a switchover circuit, which is activated by a light sensor for operating any of the cameras on the basis of the amount of light and/or the light spectrum, thereby enabling color or B/W observation in day time and IR observation during night time.

The switchover circuit further switches on the IR illuminator for darkness observation or it switches on a visual spectrum illuminators for color or B/W observation during nighttime.

The tilting adjusting mechanism is linked to all the cameras, such that all the cameras are directed to the same tilting coordinate, thereby, a switchover of observation from one camera to another will not change the observed scene.

When the housing interior combines an IR or other illuminators, the tilting link can be extended between the cameras and the illuminator as well, so as to ensure that the illuminator is directed to the same scene corresponding to the camera pan-tilt coordinates.

Alternatively, the one or more illuminators may be installed into same or a separate housing and be adjusted individually in accordance with the landscape and/or for preventing direct light reflections by the fence from reaching the lens and/or the optical path of the camera.

By this arrangement, with the one or more housings containing the one or more cameras and the one or more illuminators, all embedded and installed inside the poles or attached to the poles and positioned toward the adjacent pole, for observing the fence stretch between the two adjacent poles, can provide for observation of the entire section of the fence. Moreover, since the housing are embedded into or attached to the poles, the housing including the cameras and the illuminators are protected by the pole structure and therefore, cannot be vandalized or defeated from far, which improves greatly the camera reability to observe and detect intruders.

BRIEF DESCRIPTION OF THE DRAWINGS

The foregoing and other objects and features of the present invention will become apparent from the following description of preferred embodiments of the invention with reference to the accompanying drawings, in which.

DETAILED DESCRIPTION OF PREFERRED EMBODIMENT

Figure 1:
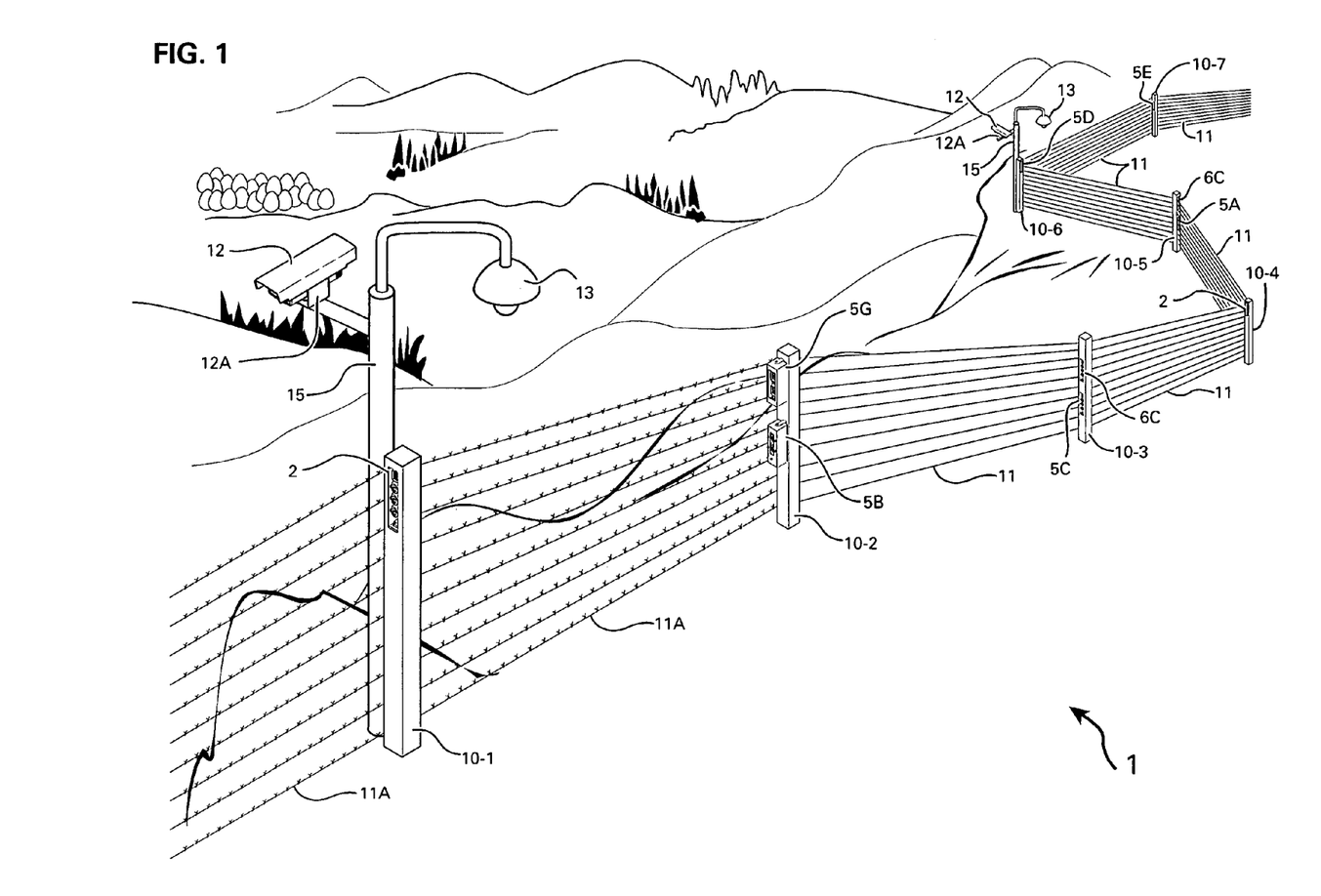
FIG. 1 is a perspective view of a fence structure including the cameras and illuminators of the present invention and of the prior art.

Shown in FIG. 1 is a fence 1 constructed of poles 10 and wire 11 or barbed wire 1A, stretched over a terrain. Adjacent to the fence are light poles 15 for supporting illuminators 13 and close circuit television camera 12 mounted on a well known camera mount 12A for adjusting the housing's pan-tilt coordinates, for directing the cameras to observe the fence. The cameras 12 are typical example of the prior art for observing fences. However the terrain and the angle of view of the camera's lenses and/or the height of the light poles 15 forces many limitations with the pan-tilt-lens coordinate positioning of the cameras 12 and its ability to view the entire section of a fence.

The camera 2 of the present invention shown in FIG. 1, mounted inside the pole 10-1, the camera 5B attached to the pole 10-2 along with the illuminator 5G, the camera 5C mounted into the pole 10-3 along with the illuminator 6C, the camera 2 mounted into the pole 10-4, the camera 5A mounted into the pole 10-5 along with the illuminator 6C, the camera 5D mounted into the pole 10-6 and the camera 5E mounted into the pole 10-7 are all positioned to observe an entire section of the fence regardless of the terrain and the angle of view of the lens. It will become obvious, including from the shown fence 1 of FIG. 1 that regardless of the lens' angle of view the cameras of the present invention, which are mounted into the pole or attached to the pole, and aimed toward the adjacent pole can view the entire section of the fence, unlike the cameras and housings of the prior art that could not be mounted into or attached to the pole.

The prior art housing has a longer horizontal structure such as the shown housing 12, which cannot be installed inside the poles, moreover, an important adjustments for the camera in the field is the adjustment of the focus and/or the varifocal or zoom ring and which cannot be carried out if the housing is installed inside the pole. In the prior art the adjustment of the focus ring is carried by removing the cover of the housing 12 for accessing the camera or the lens itself. This will be impossible if the housing of the prior art would have been installed inside a pole of the fence.

Further, the pan/tilt mount 12A attaching the camera housing 12 to the light pole 15 of the prior art is attached to the housing bottom, thereby the only way to attach the prior art camera 12 to the pole 10 will be by attaching it through a pan/tilt mount 12A to the top of the pole 10, this introduces the angle of view limitation and terrain limitation, leaving blind spots within the section view.

In order to install an outdoor camera housing inside poles, the housing system must be vertically structured, it must be sealed to prevent water from leaking into the housing, moreover the housing must be so constructed as to permit field adjustments of the focus or zoom ring and the adjustment of pan and tilt without dismantling the housing assembly. Moreover, if multiple cameras are installed inside the housing all should be adjusted simultaneously to the same direction for observing the same scene, thereby, providing identical viewing scene whenever a camera is switched over, such as from color to B/W or to IR, so that the scene displayed on a monitor or recorded by video or digital recorder remains the same.

Figure 2A:
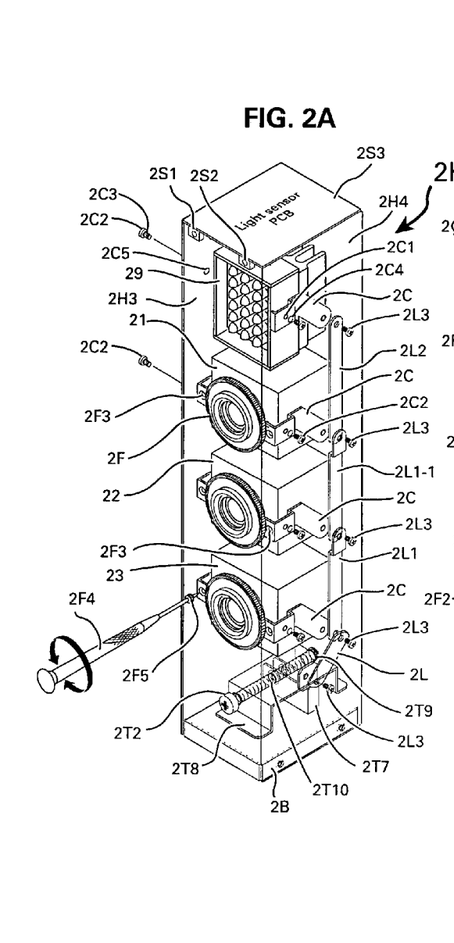
FIGS. 2A, 2B and 2C are perspective views of the cameras with an illuminator and the housing and with adjustment facilities for the pan-tilt and focus of the present invention.

Shown in FIG. 2A is the camera assembly 2H1 including color camera 21, B/W camera 22, IR camera 23 and illuminator 29. Each of the cameras includes geared focus ring 2F for enabling the adjustment of the focus ring using a driver 2F4 with a soft rounded gear 2F5, the driver's front end is supported by the guide hole 2F3 during the focus adjustment. It is however possible to use for example a rubber roller instead of the rounded soft gear 2F5 of the focus adjustment driver 2F4. Moreover, it is also possible to adjust the focus ring without the use of the guide hole 2F3. The person adjusting the focus ring using the driver 2F4 with rubber roller (not shown) replacing the gear 2F5 can adjust the focus ring by applying slight force and pressure the roller or the gear 2F5 to engage the focus ring 2F while rotating the driver 2F4 for adjusting the focus.

Figures 4A, 4B:
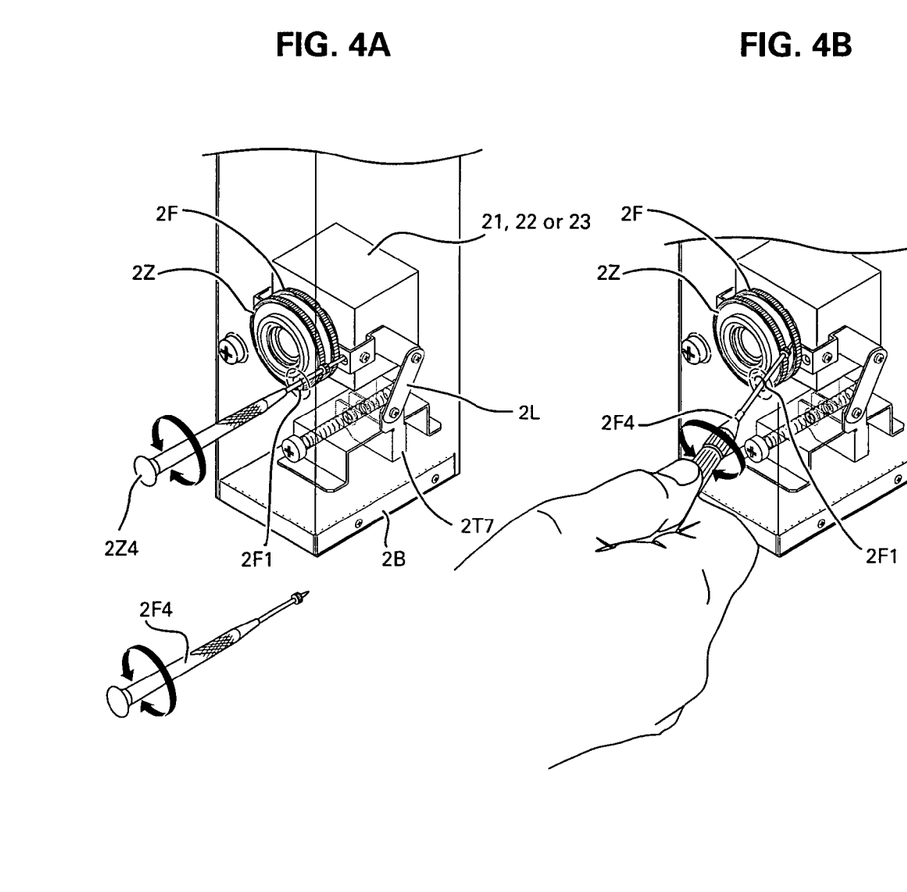
FIGS. 4A, 4B and 4C are perspective views of manual adjustment and remote control adjustment of motorized zoom or varifocal lens.

It is also possible to support the driver through the focus adjustment opening 2F1 of the camera housing 2H as shown in FIG. 4B. Since the focus and the zoom rings rarely needs to be re-adjusted after installation, the geared portion of the focus or zoom rings and of the gear 2F5 of the adjustment driver, or a rubber roller (not shown) replacing the gear 2F5, need not to be precise and accurate. It is only necessary to engage the geared edge focus ring 2F or the zoom ring 2Z with the gear 2F5 or with the rubber roller instead, such that while a serviceman is rotating the driver 2F4 or 2Z4 of FIG. 4A or the driver 2F4 of FIG. 4B will rotate with it the focus or zoom ring, which commonly require very slight force.

The camera assembly further includes an illuminator 29, light sensing and switchover circuit 2S3 including two sensors 2S1 and 2S2. Also incorporated in the camera assembly 2H1 is a tilting adjustment facilities including tilting adjustment screw 2T2, tilting base 2T8, tilting slider 2T7 and tilting links 2L, 2L1 and 2L2.

The cameras 21, 22 and 23 and the illuminator 29 are supported by a camera support 2C having its center rotation 2C1, through which the cameras and the illuminator are attached to the assembly 2H1 chassis via holes 2C4 in its right side 2H4, and in its left side 2H3 using the screws 2C2 shown in FIG. 2A.

As shown in FIG. 2A the screws 2C2 are collard screws having a collar 2C3 that is thicker than the thickness of the left side chassis 2H3 or the right side chassis 2H4 for enabling free tilting movement for the camera support 2C even when the screws 2C2 are tightly fastened.

Figure 3A:
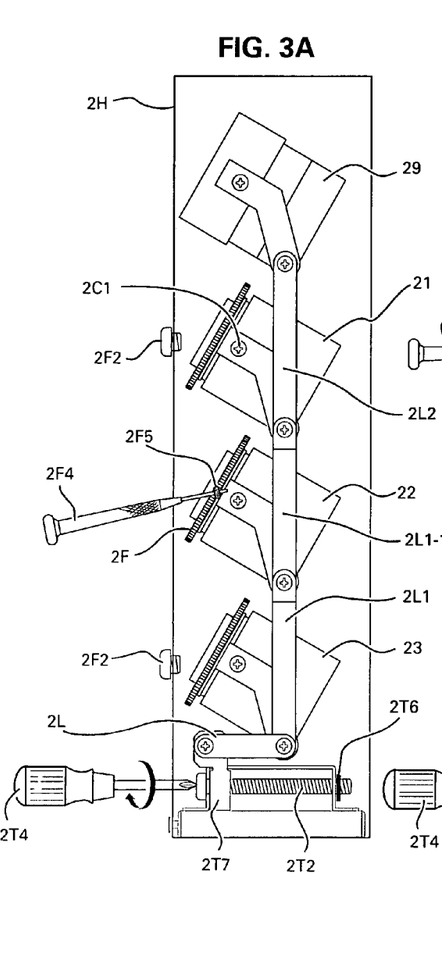
FIGS. 3A, 3B and 3C are side views of the cameras tilt and focus adjustment.
Figures 3B, 3C:
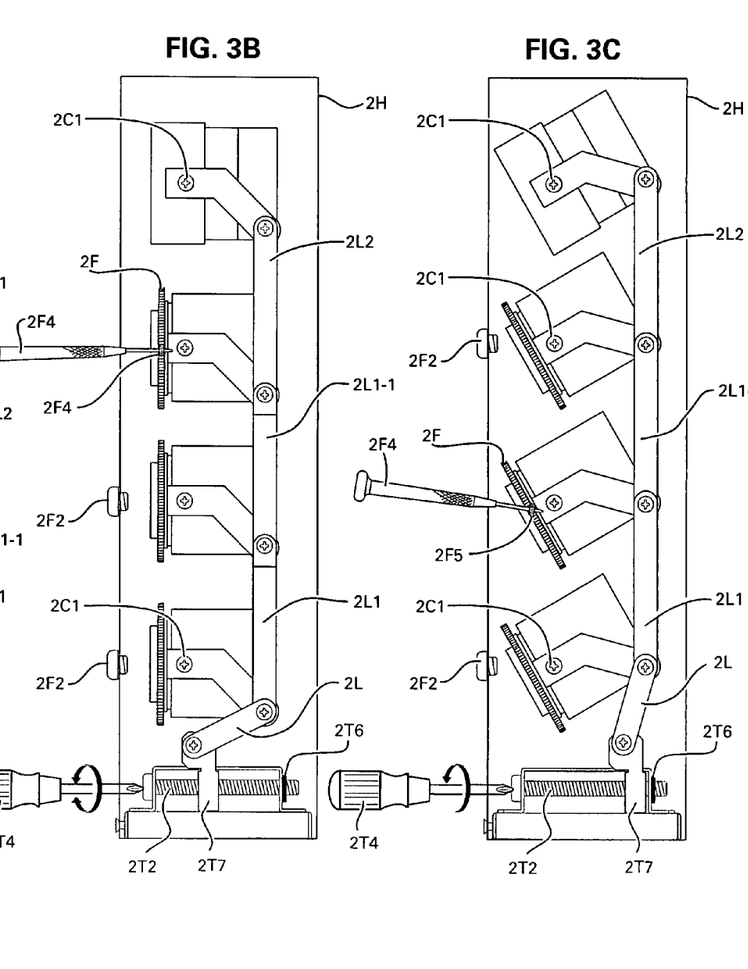

The tilting base 2T8 is attached to the bottom cover 2B of the camera assembly 2H1, which also support the two sides 2H3 and 2H4 of the chassis assembly. The tilting adjusting screw 2T2 passes through the two holes 2T9 and through threaded holes 2T10 of the tilting slider 2T7. The tilting screw is secured to the tilting base by a locking ring 2T6 shown in FIGS. 3A~3C. By this arrangement the rotating of the tilting adjusting screw 2T2 clockwise will move the slider 2T7 all the way to the front of tilt base 2T8 shown in FIG. 3A, while counter clockwise rotation will move the slider 2T7 all the way to the back of the tilt base 2T8, shown in FIG. 3C, and any random rotating of the tilting adjusting screw 2T2 will move the slider 2T7 to a position along the screw 2T2 within the tilting base 2T8 movement range as shown in FIG. 3B.

The tilting slider 2T7 is attached to a link 2L using screw 2L3, the link 2L is attached to the camera support 2C of camera 23 and to a link 2L1 using another screw 2L3. The screw 2L3 shown is a collard screw, similar to the screws 2C2 shown in FIG. 2A, for providing spacing between the links 2L1 and 2L and between the link 2L and the tilting movements slider 2T7 in order to enable free tilting even when the screws 2L3 are tightly fastened. The link 2L1 is further linked to the camera support 2C of camera 22 and to another link 2L1-1, which is further linked to camera support 2C of camera 22. The link 2L1-1 is attached to camera support 2C of camera 21 and to a link 2L2 for linking to camera holder 2C of the illuminator 29. All the links 2L1, 2L1-1 and 2L2 are attached to their respective camera support 2C using collard screw 2L3, which can be tightly fastened and provide free movements between the links and the camera supports 2C.

The camera support 2C is attached by two collard screws 2C2 to the two sides of the chassis, 2H3 left and 2H4 right through the holes 2C4 and 2C5 shown in the camera assembly chassis of FIG. 2A. The threaded hole 2C1 of the camera support is the camera's or the illuminator's tilting movement center. By linking all the camera's and the illuminator supports 2C to the tilting slider 2T7 through the links 2L, 2L1, 2L1-1 and 2L2 enables the adjustment of all the camera's and the illuminator tilting around the tilting movement centers 2C1 shown in FIGS. 3A, 3B and 3C through the tilting adjustment screw 2T2 using the tilting screwdriver 2T4.

Figure 2B:
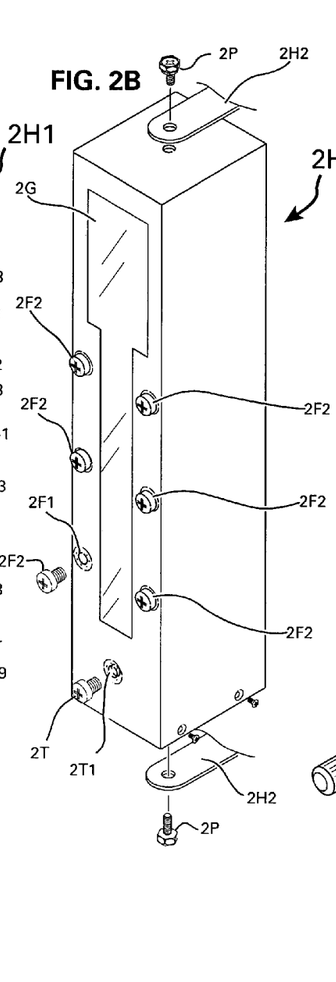

The housing 2H shown in FIG. 2B includes a front pane 2G, which has wider opening at its upper portion for providing the illuminator 29 with wider angle emission, commensurating with the angle of light emission that is preferable to be wider than the lens's angle of view, for illuminating the entire viewed scene observed by the cameras 21, 22 and 23.

The housing 2H shown in FIG. 2B further includes six focus and/or zoom adjustment access holes with thread 2F1, five focus access holes are shown sealed with sealing screws 2F2. Similarly the tilting adjustment access hole with thread 2T1 is shown with its sealing screw 2T removed. As the housing for fences must be sealed to prevent water from leaking into the housing, each of the sealing screws 2F2 and 2T includes seal, alternatively the seal is attached to the surface of the adjustment opening access 2F1 and 2T. Similarly the front pane 2G is sealed throughout, along with the bottom cover 2B shown in FIG. 2A.

Figure 2C:
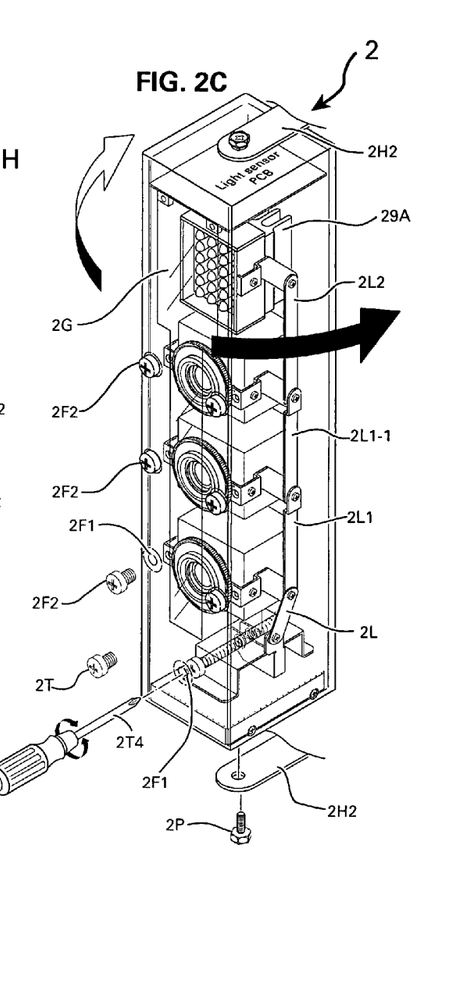

The entire camera/housing assembly 2 is supported by two, top and bottom, panning brackets 2H2, via two panning locking screws 2P. Different shaped panning brackets 2H2 can be used, such as for attaching the brackets to the side of the pole, or specially constructed brackets to fit the brackets with the inner structure of a given pole. Alternatively, the two partly shown brackets 2H2 can be part of a single pole or wall mount for attaching the housing to a vertical structure such as the mount 2H2 of FIG. 10A. But regardless of the exact shape of the bracket 2H2, it is obvious that the entire vertically structured camera/housing assembly 2 shown in FIG. 2C can be rotated to the left and the right about the panning axis of the assembly, represented by the panning locking screws 2P.

By this it become obvious that the pan and tilt of the camera/housing assembly 2 can be adjusted within the interior of a pole, or when the assembly 2 is attached to a pole and that the focus and/or the zoom rings of the lens can be accessed and adjusted without dismantling the housing. Further, to protect the camera assemblies inside the pole it is preferable to cut the smallest possible window for the camera and/or the illuminator. This is also because larger cut window reduces the structural strength of the pole and exposes the camera to acts of vandalism. On the other hand a smaller cut window may prevent free access to the focus adjustment screws 2F2, because the access to the screws 2F2 is dependent upon the panning coordinate position setting, wherein a smaller window may cover, for example, the left side focus access screws 2F2 of a camera that is positioned to the left. For this reason two set of focus access screws 2F2 are provided for each camera 21, 22 or 23 of the camera/housing assembly 2. By such arrangement the right side access screws 2F2 are used for camera assembly 2 positioned to the left, and the left side access screws 2F2 are used for camera assembly positioned to the right, and this enables a smaller window size to be cut in the poles.

The light sensing circuit 2S3 uses well known light sensors, such as photo diodes or photo transistors having broad or limited sensitivities for a specific visual light spectrum, or UV, or to IR. The sensors may include a well known optical pass or cut filters to match the sensors spectrum with the surrounding illuminators, or for example to match the sensor with an IR illuminator of the camera assembly 2.

The light sensing circuit 2S3 further includes well known switching circuits or relays for switching over the camera's video or digital signals from one selected camera to another, on the basis of the sensing signals and/or may further include well known CPU or timer circuit for setting specific operation schedule, on the basis of time and date, all of which are based on well known technique for selecting the correct camera 21, 22 or 23 for the correct application. The connecting wires and cables for the camera assembly 2 are not shown, as they are very well known as well.

By this it becomes clear and obvious that the camera/housing assembly 2 can be attached to a pole, or installed inside a pole for observing the whole length of a section of a fence, this is further enhanced by adjusting the camera panning and tilting coordinates toward the adjacent fence pole. It is further obvious that the focus and/or zoom or varifocal rings can be accessed and adjusted while the housing is mounted, without disassembling the housing and that the access holes can be sealed and that the camera remains protected from rain or snow and better secured from vandalism and destruction.

Figure 4C:
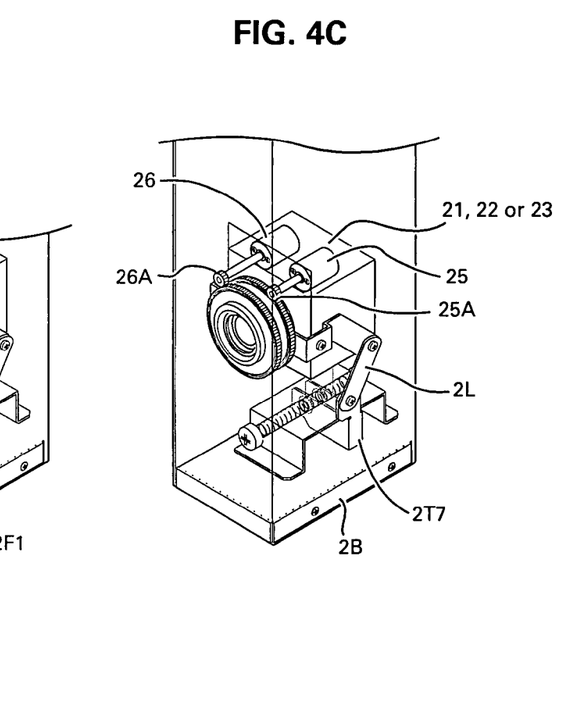

As shown in FIG. 4C the cameras 21, 22 or 23 may include one or two geared motors for remotely adjusting the focus ring and/or the varifocal or zoom lens. The focus motor 25 with its geared shaft is attached to the camera 21, 22 or 23 body having its gear 25A engaged with the focus ring 2F. The varifocal or zoom motor 26 with its geared shaft is attached to the camera 21, 22 or 25 body, having its gear 26A engaged with the varifocal or zoom ring 2Z. The one or two motors 25 and 26 used with the camera 21, 22 or 23 are operated by variety of well known remote control devices that drive the motors either clockwise or counter clockwise to obtain the best focus under any of the illuminators environment and the correct angle of view through the varifocal or zoom adjustment.

The camera assembly shown in FIG. 4C therefore requires no focus access hole 2F1, nor the focus access screw 2F2, and the housing shown in FIG. 4C does not include the focus access arrangement.

In a further embodiment, an upright camera housing with at adjustable pan position and with upright front pane for at least one camera with adjustable lens and tilt comprising a mount for installing said housing onto a vertical structure selected from a group consisting of a pole, column, post, pillar and a wall and for attaching said mount to said housing by fasteners at said housing horizontal axis for enabling the adjustment and the locking of said adjustable pan position around said horizontal axis; an adjustment tilt for said at least one camera within the interior of said housing through a screw guided movable slider driven by first adjustment tool and linked to said at least one camera and wherein said adjustment tool is accessed through first sealed access of said housing; an adjustable lens for each said camera selected from a group comprising a fixed focal lens, varifocal lens and zoom lens including at least one adjustable ring selected from a group consisting of focus ring, varifocal ring, zoom ring and a combination thereof, for providing adjustment of said adjustable ring selected from a group consisting of manual adjustment and remote control adjustment; wherein said manual adjustment is accessed by second adjustment tool through at least one second sealed access of said housing for engaging and adjusting said adjustable ring and wherein said remote control adjustment is provided by at least one geared motor engaged to said at least one adjustable ring; and wherein said first sealed access and said second sealed access can be opened for adjustment and re-sealed after adjustment.

In yet a further embodiment, an upright illuminator housing with at least one illuminator with adjustable pan and tilt within the interior of said housing comprising; a mount for installing said housing onto a vertical structure selected from a group consisting of a pole, column, post, pillar and a wall, wherein said mount can be attached by fasteners to said housing at its horizontal axis for enabling the adjustment and the locking of said housing pan position around said horizontal axis; each said illuminator is attached by dual fasteners at its tilting axis to a panning frame and said panning frame is attached by a fastener at its panning axis of one side and by dual semi circle blocks at its panning axis of the opposite side to a support assembly; said support assembly is mourned inside said housing and includes dual jaws each having cutout for accommodating said dual semi circle blocks and a vise screw for vising said dual send circle blocks between said jaws; said panning frame is cut open at its panning axis of said opposite side with each of the open cut is attached to one of said semi circle blocks, such that a whole circle block is introduced into said cutouts of said dual jaws, wherein said frame become loose around said illuminator and about its panning axis when said vise screw is released, thereby enabling to manually adjust the pan and tilt of said illuminator, and tightly locked onto said illuminator and about its panning axis when said vise screw is tightly vising said dual semi circle blocks between said jaws; and an open window of said housing provides open accesses for said at least one illuminator and for manually adjusting the pan and tilt direction of said illuminator and for a driver to lock and unlock said vise screw.

As explained the camera and housing assembly 2 includes color, B/W and IR cameras 21, 22 and 23 and a single illuminator 29. However, depending on the application and the specific needs for a given observation of a fence it may be necessary to separate the illuminator 29 from the camera assembly 2 and moreover, it may be unnecessary to include three cameras inside the housing 2H. For example it may be sufficient to have a single camera for the fence observation with a larger power illuminator, such as with triple illuminators 29.

Figures 5A, 5B, 5C, 5D, 5F, 5G, 5H:
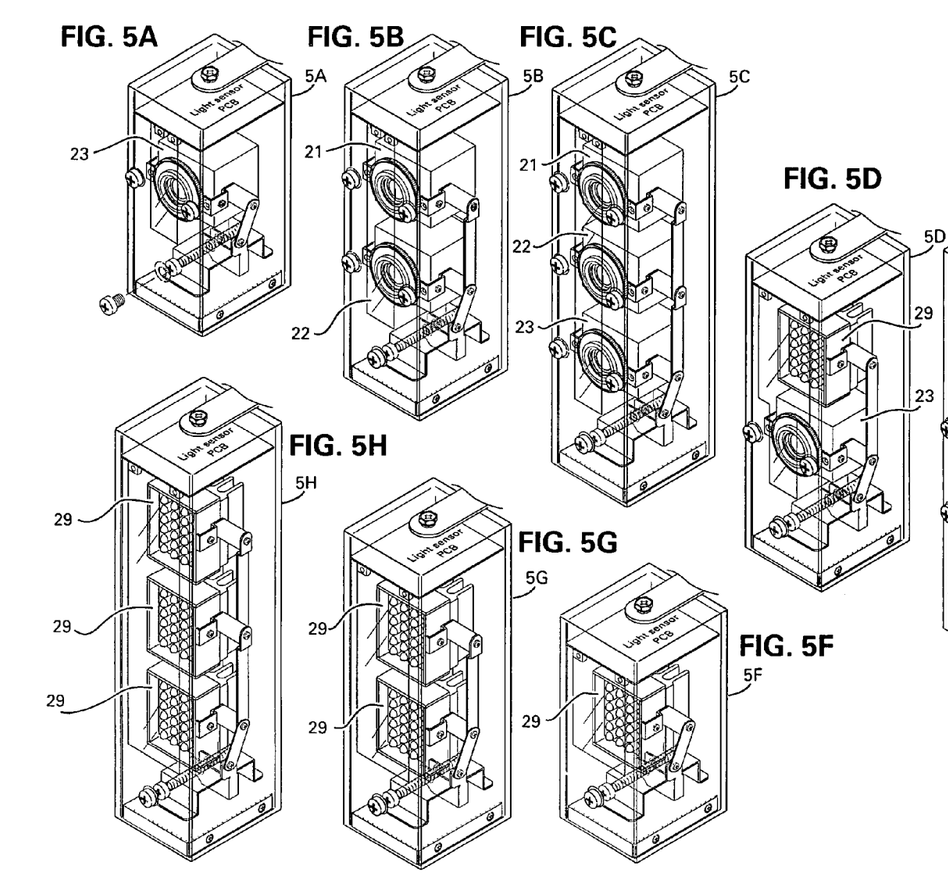
FIGS. 5A, 5B, 5C, 5D, 5E, 5F, 5G and 5H are perspective views of different cameras and illuminators combinations of the preferred embodiment of the present invention.
Figure 5E:
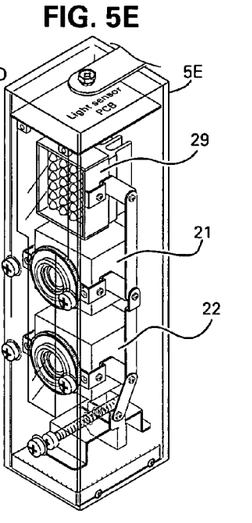

Shown in FIG. 5A is a fence camera assembly including a single camera housing 5A and day-night or IR camera 23. The housing 5B of FIG. 5B is for dual camera, such as the shown color camera 21 and B/W camera 22, while the housing 5C shown in FIG. 5C is for three cameras. Similarly, the housing 5D of FIG. 5D includes a single camera 23 and a single illuminator 29, while the housing 5E of FIG. 5E includes two cameras 21 and 22 and a single illuminator 29. The housing 5H of FIG. 5H on the other hand incorporates no camera, but instead it incorporates three illuminators 29, while the housing 5G incorporates two illuminator 29 and no camera. The housing 5F of FIG. 5F incorporates only a single illuminator 29. It is obvious however that by extending the vertical length of the housing it is possible to install any practical number of cameras and/or illuminators in the housing assembly of the present invention.

The common to all the housing 5A, 5B, 5C, 5D, 5E, 5F, 5G and 5H is that they all incorporate tilting adjustment mechanism for adjusting one or two, three or more cameras or adjusting the tilting of one, two or more cameras combined with one, two or more illuminator, or for adjusting the tiling of one, two, three or more illuminators. Any type of camera can be employed in the housing assembly of the present inventions, be it color, B/W, IR or day-night, similarly any type of illuminator can be employed such as visual spectrum illuminator, IR illuminator, UV illuminator for illuminating the scene with specific or wide spectrum.

Different sensors 2S1 and 2S2 of the sensing circuit 2S3 of FIG. 2A such as IR, UV or visual spectrum can be used and employed along with any type of cut or pass through optical filters to match with the selected cameras and illuminator. Further the sensors and filters can be selected on the basis of the specific fence being observed and the surrounding illumination environment.

Moreover, the housing assembly with its adjustment facilities for pan, tilt, focus and varifocal or zoom can be conveniently installed on walls of buildings, both indoors and outdoor and used for variety of security applications other than for fence observation. Long vertical structure that can be attached to a surface of a wall, pole and other vertical structures offer many advantages, such as improved housing stability and architectural harmony with the building's exterior and interior.

Figure 10A:
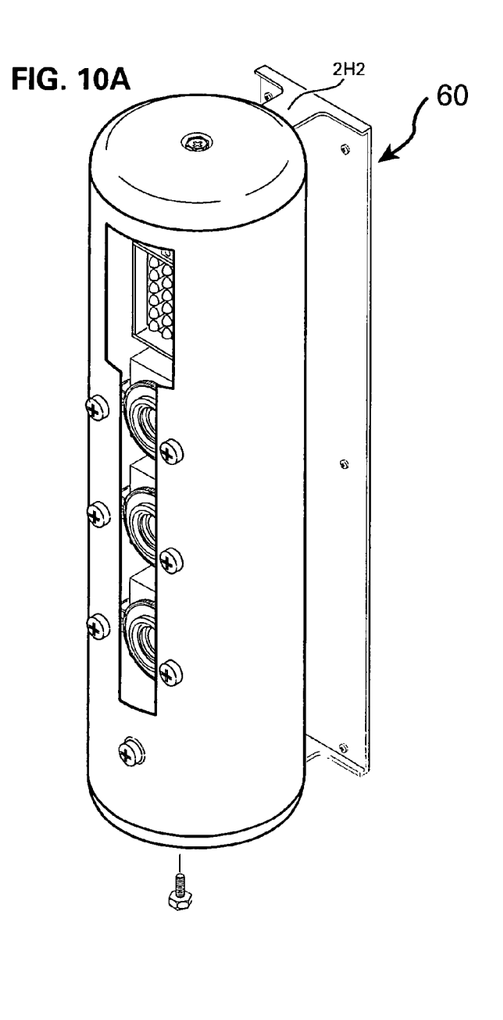
FIGS. 10A, 10B and 10C are perspective views of the housing assemblies with different design for providing improved architectural appearance.
Figure 10B:
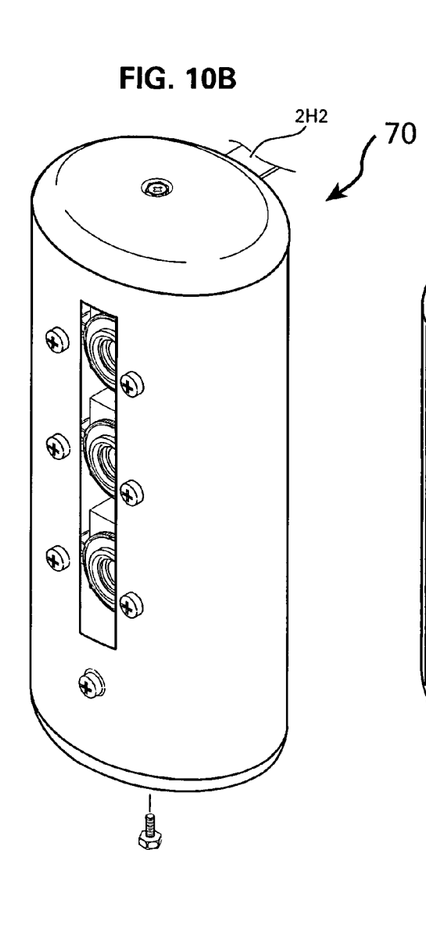
Figure 10C:
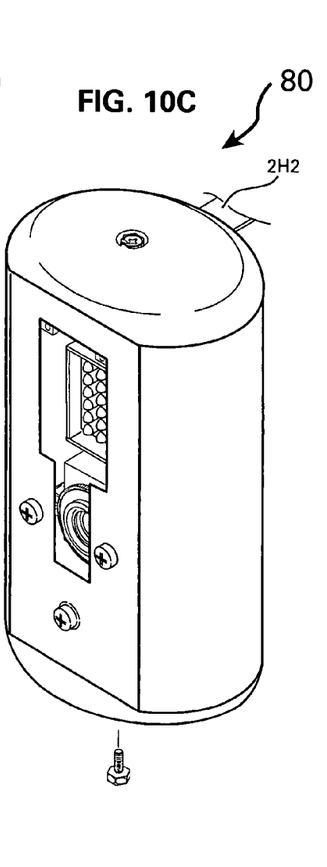

The housing 2H shown in FIG. 2B and the housings 5A~5H of FIGS. 5A~5H are box type casing, however any other shape such as round housing 60, oval housing 70 or truncated oval housing 80, shown in FIGS. 10A, 10B and 10C, or other designs, can be employed. The housing can be molded or extruded using a plastic material such as clear polycarbonate material or aluminum having a pane made of glass or made of acrylic material and/or other combinations of selected metals and plastic materials.

The two illuminators 29 shown in FIG. 5G can only be adjusted and directed to a common pan-tilt coordinate, same applies to the three illuminators 29 of FIG. 5H. Directing all the individual illuminators 29 toward the same scene increases the illumination intensity, but does not necessarily provide good illumination condition for a given observation needs. For example high intensity IR illuminator for a fence observation may cause serious IR reflection by the fence wires 11 or barbed wires 11A shown in FIG. 1. The reflected IR may reach directly the CCD devices of the cameras and introduce bright vertical gleams into the pictures depicted on the surveillance system monitors and recorders.

For such and other illumination need reasons it may become necessary to provide for multiple illuminators 29 with simple adjustments of the pan and tilt for each individual illuminator.

Figures 6A, 6B, 6C:
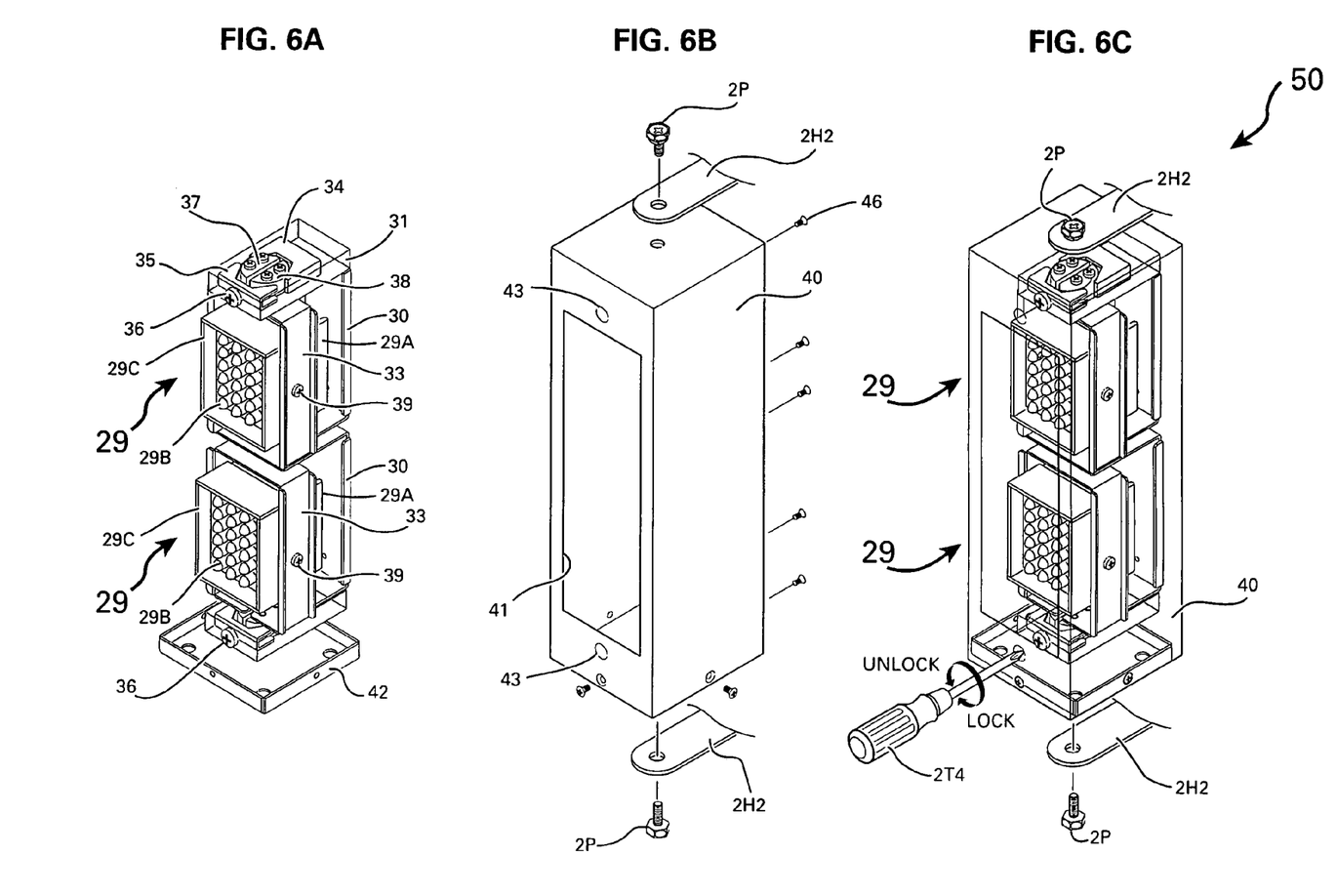
FIGS. 6A, 6B and 6C are perspective views of the illuminators of the present invention with housing and with the pan-tilt adjustment and locking facilities for each individual illuminator.

Shown in FIG. 6A are two illuminators 29 comprising raws of LEDs for emitting visual spectrum light, or IR, or UV light or any other specific light spectrum. The LEDs 29B are surrounded by a case 29c and are attached to heat sink 29A for dispersing the accumulated heat generated by the LEDs 29B. The entire illuminator assembly 29 including the LEDs 29B, the surrounding case 29C, the rear heat sink 29A and the connecting wires (not shown) are all sealed by a sealing compound, such as epoxy resin or silicon seal or similar, so as to make the illuminator 29 all weather resistant.

By this arrangement the housing 40 shown in FIG. 6B does not need to be sealed for outdoor installation and moreover it does not require front pane, such as the front pane 2G of the housing 2H or the housing 5F, 5G and 5H. The open window 41 in the housing 40, incontrast to the sealed pane 2G, provide free air circulation, which cools the heat sink 29A and improve upon the LEDs 29B illumination efficiency. Moreover the open window 41 provides access for manually adjusting the pan-tilt direction coordinates of each individual illuminator 29, this is achieved by unlocking the locking screw 36 of FIG. 6A, using the screwdriver 2T4 shown in FIG. 6C.

The two illuminators 29 shown in FIG. 6A are shown locked into straight forward position around the tilting axis about the collard screws 39, and around the panning axis about the collard screws 32 shown in FIG. 7A and FIGS. 8A~8D. The illuminator assembly 50 including the two illuminators 29 inside the housing assembly 40 shown in FIG. 6C can be mounted attached to a pole of a fence or to a wall or to any other vertical structure using the top and bottom mounts 2H2, similar to the mounting of the camera and housing assembly 2C.

By this the entire illuminator assembly 50 can be rotated to the left or the right around the panning axis represented by the panning locking screw 2P. The illuminator assembly 50 can be mounted also inside a fence pole, using mounting brackets 2H2, similar to the brackets used for mounting the camera and housing assembly 2C. The bottom cover 42 of FIG. 6A and the top surface of the housing 40 are provided with thread for the panning locking screw 2P and the rear surface of the housing 40 includes mounting holes for attaching the individual illuminator 29 using screws 46 and may include ventilation holes for providing better air circulation for reducing the heat generated by the illuminators 29.

The bottom cover 42 is secured to the housing 40 by means of screws, requiring no seals. As explained each of the illuminators 29 is individually sealed by sealing compound such as epoxy resin or silicon seal or similar, and therefore the illuminator assembly 50 can be installed indoors and outdoor exposed to rain or snow with its front window 43 fully exposed and fully open, which also provides for adjusting manually the pan-tilt direction of each illuminator 29.

The access for the screw driver 2T4 are provided via the open holes 43 in the front surface of the housing 40, however it is also possible to increase the window 41 length to expose the locking screw 36 through the window 41. The shown housing 40 is for incorporating two only illuminators 29, however it is clear and obvious that the housing vertical length can be extended to accommodate any practical number of illuminator 29, such as three, four, five or more illuminators 29, with each individual illuminator 29 can have its pan-tilt direction individually adjusted and locked.

Figure 7A:
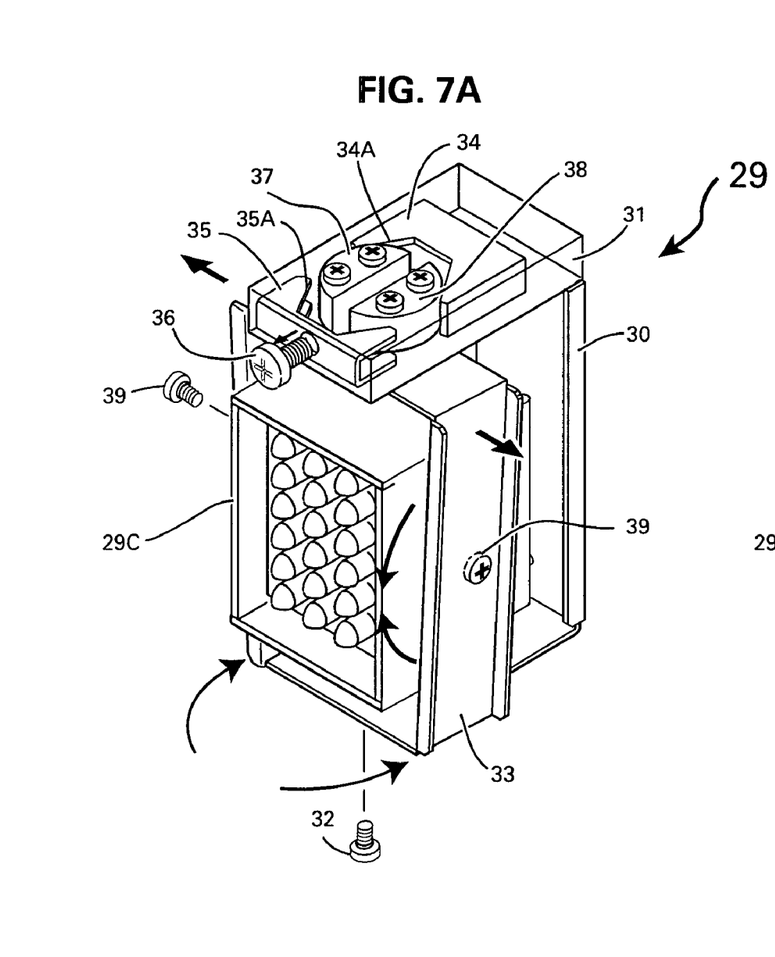
FIGS. 7A and 7B are perspective views of the locking and unlocking mechanism and of the adjustment of another preferred embodiment of the illuminator of the present invention.
Figure 7B:
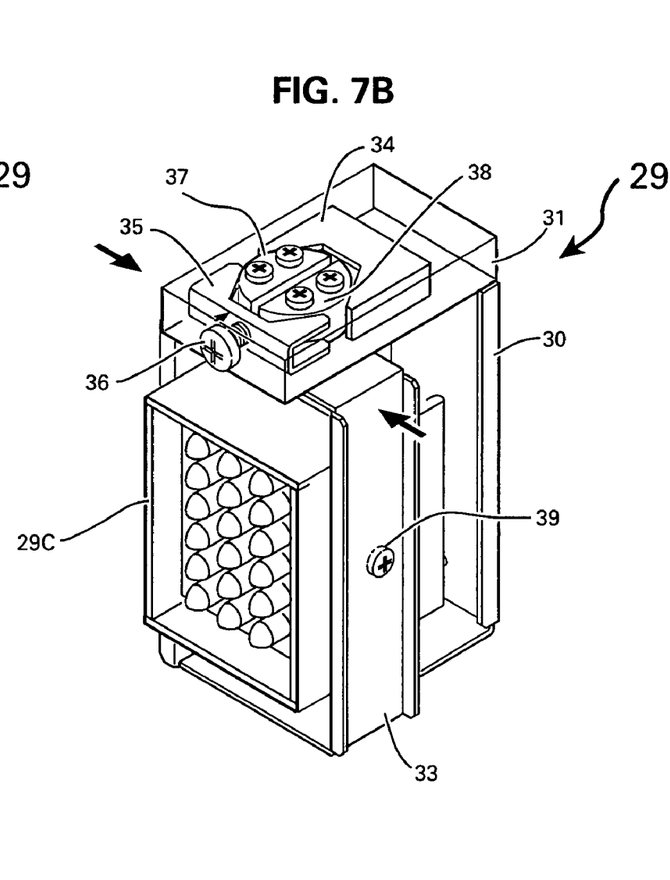

Shown in FIGS. 7A and 7B is the illuminator's 29 pan-tilt locking mechanism. The illuminator case 29C is supported by two collard screws 39 to the frame 33, such that the illuminator case 29C can be tilted up or down about the tilting axis, represented by the screws 39. The frame 33 is attached and supported by a collard screw 32 to the illuminator holder 30 and by two semi circle blocks 37 and 38 to the illuminator locking holder 31, such that the frame 33 can be rotated to the left and right around the panning axis represented by the collard screw 32 and the center of the circle combining the two semi circle blocks 37 and 38. The frame 33 is cut open along with the semi circle blocks 37 and 38. Therefore if the semi circle blocks are apart the frame 33 become loose around the illuminator case 29C as shown in FIG. 7A and when the semi circle blocks 37 and 38 are tighten together the frame 33 is tightly pressured against the two vertical sides for the illuminator case 29C as shown in FIG. 7B.

The illuminator locking holder 31 includes fixed jaw 34 and movable jaw 35 and the movable jaw 35 can be vised by the locking screw 36. The two jaws 34 and 35 include a cutout portion 34A and 35A for accommodating the two semi circle blocks, such that when the locking screw 36 is tighten clockwise the movable jaw 35 moves to clamp and vise the two semi circle blocks 37 and 38 to its pan position and moreover the two semi circle block themselves vise the frame 33 onto the illuminator case 29C, thereby locking also the illuminator case 29C to its adjusted tilt position as shown in FIG. 7B.

The adjusting of the pan-tilt of the illuminator 29 can be carried whenever the locking screw 36 is unlocked and the illuminator case is freely moving in all direction. By slight pushing of the case 29C with a finger up, down, left or right it becomes simple to set the illuminator into its intended direction. The locking of the screw 36 by a driver such as the driver 2T4 shown in FIG. 6C completes the adjustment of the illuminator 29.

Figure 8A:
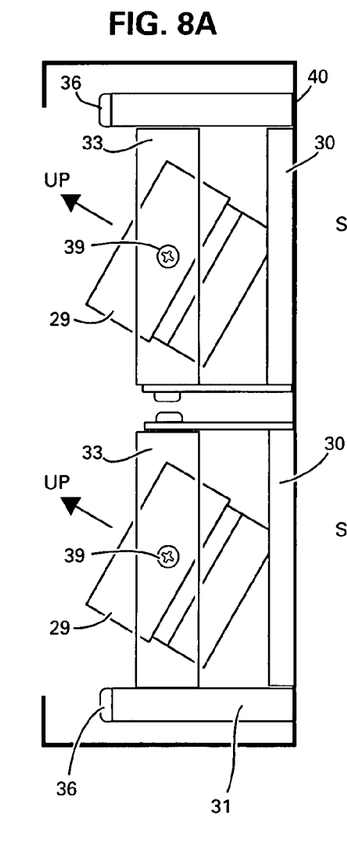
FIGS. 8A, 8B, 8C and 8D are side views of the tilting adjustment range for the illuminators of the present invention.
Figure 8B:
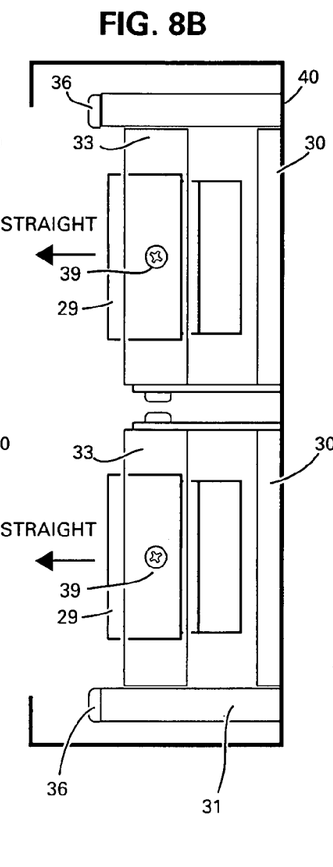
Figure 8C:
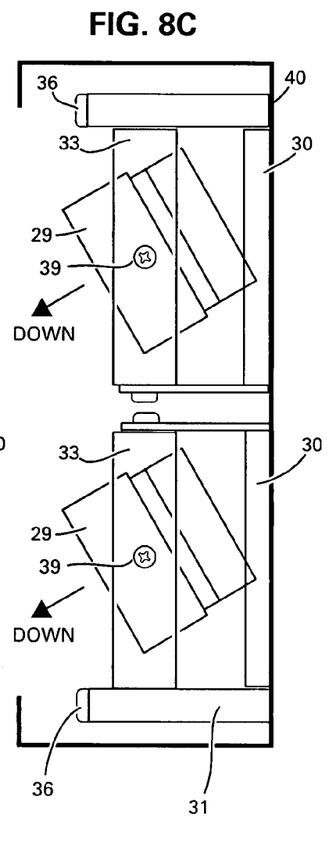
Figure 8D:
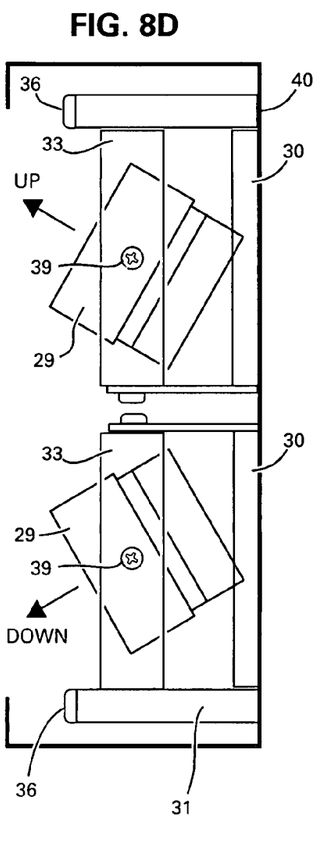

As each illuminator 29 can be adjusted individually the range of adjustments of the illuminator assembly 50 of FIG. 6C are shown in FIGS. 8A~8D and FIGS. 9A~9C. FIGS. 8A, 8B, 8C and 8D are side view of the illuminators tilt position, with the frame 33 set to its center, or straight forward position, such as the position shown in the top view of FIG. 9B. FIG. 8A shows the two illuminators 29 tilted upward, FIG. 8B shows the two illuminators 29 set to straight forward position, FIG. 8C shows the two illuminators 29 tilted downwards and FIG. 8D shows the one illuminator 29 tilted upward and the other illuminator 29 tilted downwards.

Figure 9A:
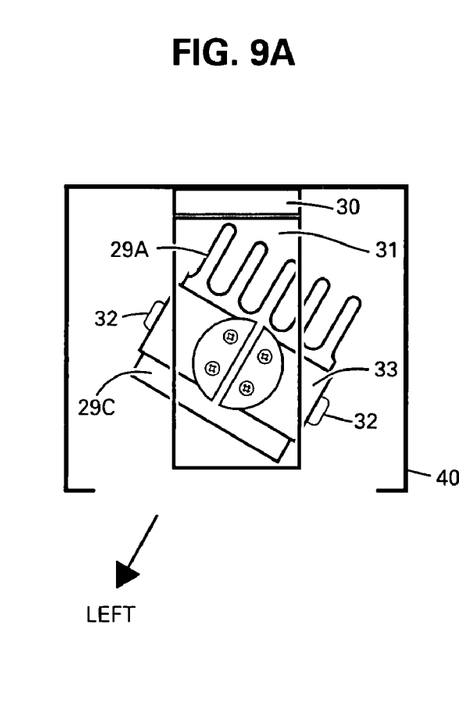
FIGS. 9A, 9B and 9C are top views of the panning adjustment range for the illuminators of the present invention.
Figure 9B:
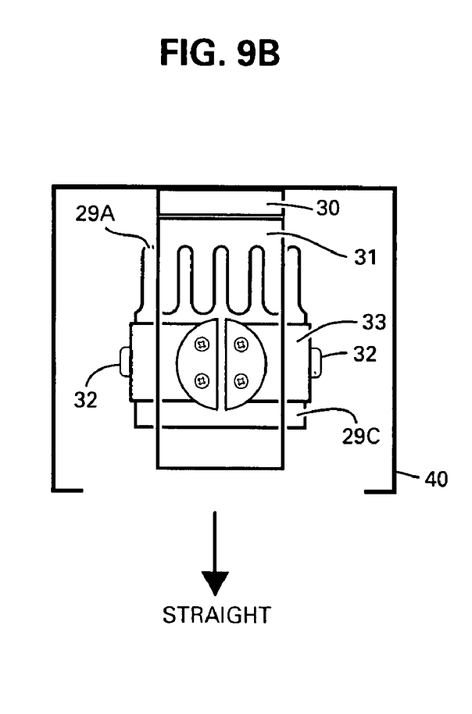
Figure 9C:
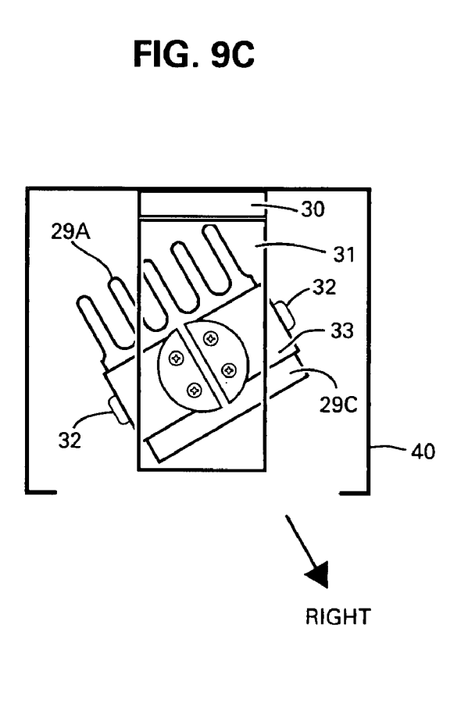

FIGS. 9A, 9B and 9C are top view of the illuminator 29 pan position with the illuminator's tilt set to straight forward, such as the position shown in the side view of FIG. 8B. FIG. 9A shows the illuminator set to the left, FIG. 9B shows the illuminator set to straightforward position and FIG. 8C shows the illuminator set to the right.

The housing with cameras and/or illuminators assemblies of the present invention can be modified by changing one or more of the well described adjustments of focus and/or zoom or varifocal lens as well as the tilting setting or the links connecting one or more cameras and/or illuminators. In fact, it becomes obvious that unlimited shapes and sized can be designed for camera housings that can incorporate the means to adjust the focus, zoom, varifocal, tilt and pan. It will of course, be understood by those skilled in the art that the particular embodiment of the invention here presented is by way of illustration only, and is meant to be in no way restrictive, therefore, numerous changes and modifications may be made, and the full used of equivalents resorted to, without departing from the spirit of scope of the invention as outlined in the appended claims.

What is claimed is:

1. An upright camera housing with adjustable pan position and with upright front pane for at least one camera with adjustable lens and tilt comprising;
   a mount for installing said housing onto a vertical structure selected from a group consisting of a pole, column, post, pillar and a wall and for attaching said mount to said housing by fasteners at a housing horizontal axis for enabling the adjustment and the locking of said adjustable pan position around said horizontal axis;
   an adjustable tilt for said at least one camera within the interior of said housing through a screw guided movable slider driven by a first adjustment tool and linked to said at least one camera and wherein said adjustment tool is accessed through a first sealed access of said housing;
   an adjustable lens for each said camera selected from a group comprising a fixed focal lens, varifocal lens and zoom lens including at least one adjustable ring selected from a group consisting of focus ring, varifocal ring, zoom ring and a combination thereof, for providing adjustment of said adjustable ring selected from a group consisting of manual adjustment and remote control adjustment; wherein
   said manual adjustment is accessed by a second adjustment tool through at least one second sealed access of said housing for engaging and adjusting said adjustable ring and wherein said remote control adjustment is provided by at least one geared motor engaged to said at least one adjustable ring; wherein said first sealed access can be opened for adjustment and re-sealed after adjustment; and wherein said second sealed access used for manual adjustment can also be opened for adjustment and re-sealed after adjustment.

2. The upright camera housing according to claim 1, wherein said mount is constructed for installing said housing inside said vertical structure.

3. The upright camera housing according to claim 1, wherein two said second sealed access are included for each said camera, one on the left side and one on the right side of said adjustable ring.

4. The upright camera housing according to claim 1, wherein said housing is sealed housing for outdoor application.

5. The upright camera housing according to claim 1, wherein said housing is fabricated by material and process selected from a group consisting of molded plastic, extruded plastic, extruded aluminum, pressed metal sheet and a combination thereof and wherein said pane is fabricated from material selected from a group consisting of plastic, glass and acryl.

6. The upright camera housing according to claim 1, wherein said housing further includes at least one light sensor and a switch circuit for switching over said camera operation, selected from color, B/W and IR and for switching on and off an illuminator associated with said camera operation.

7. An upright camera housing with adjustable pan position and with upright front pane for at least one illuminator and at least one camera with adjustable lens and tilt comprising;
   a mount for installing said housing onto a vertical structure selected from a group consisting of a pole, column, post, pillar and a wall and for attaching said mount to said housing by fasteners at a housing horizontal axis for enabling the adjustment and the locking of said adjustable pan position around said horizontal axis;
   an adjustable tilt for said at least one illuminator and at least one camera within the interior of said housing through a screw guided movable slider driven by a first adjustment tool and linked to said at least one illuminator and said at least one camera and wherein said adjustment tool is accessed through a first sealed access of said housing;
   an adjustable lens for each said camera selected from a group comprising a fixed focal lens, varifocal lens and zoom lens including at least one adjustable ring selected from a group consisting of focus ring, varifocal ring, zoom ring and a combination thereof, for providing adjustment of said adjustable ring selected from a group consisting of manual adjustment and remote control adjustment; wherein
   said manual adjustment is accessed by a second adjustment tool through at least one second sealed access of said housing for engaging and adjusting said adjustable ring and wherein said remote control adjustment is provided by at least one geared motor directly engaging said at least one adjustable ring; wherein said first sealed access can be opened for adjustment and re-sealed after adjustment; and wherein said second sealed access used for manual adjustment can also be opened for adjustment and re-sealed after adjustment.

8. The upright camera housing according to claim 7, wherein said mount is constructed for installing said housing inside said vertical structure.

9. The upright camera housing according to claim 7, wherein two said second sealed access are included for each said camera, one on the left side and one or the right side of said adjustable ring.

10. The upright camera housing according to claim 7, wherein said housing is sealed housing for outdoor application.

11. The upright camera housing according to claim 7, wherein said housing is fabricated by material and process selected from a group consisting of molded plastic, extruded plastic, extruded aluminum, pressed metal sheet and a combination thereof and wherein said pane is fabricated from material selected from a group consisting of plastic, glass and acryl.

12. The upright camera housing according to claim 7, wherein said housing further includes at least one light sensor and a switch circuit for switching over said camera operation, selected from color, B/W and IR and for switching on and off an illuminator associated with said camera operation.

13. The upright camera housing according to claim 1 further including a complementary upright illuminator housing with adjustable pan position and with upright front illuminator pane for at least one illuminator with adjustable tilt comprising;
an illuminator mount for installing said illuminator housing onto a vertical structure selected from a group consisting of a pole, column, post, pillar and a wall and for attaching said illuminator mount to said illuminator housing by fasteners at a illuminator housing horizontal axis for enabling the adjustment and the locking of said adjustable pan position around said horizontal axis;
an adjustable tilt for said at least one illuminator within the interior of said illuminator housing through a screw guided movable slider driven by an adjustment tool driver and linked to said at least one illuminator and wherein said adjustment tool is accessed through a sealed illuminator access of said illuminator housing; and
said sealed illuminator access can be opened for adjustment and re-sealed after adjustment.

14. The upright camera housing according to claim 13, wherein said illuminator mount is constructed for installing said illuminator housing inside said vertical structure.

15. The upright camera housing according to claim 13, wherein said illuminator housing is scaled housing for outdoor application.

16. The upright camera housing according to claim 13, wherein said illuminator housing is fabricated by a material and a process selected from a group consisting of molded plastic, extruded plastic, extruded aluminum, pressed metal sheet and a combination thereof and wherein said illuminator pane is fabricated from material selected from a group consisting of plastic, glass and acryl.

17. The upright camera housing according to claim 13, wherein said illuminator housing further includes at least one light sensor and a switch for switching said illuminator on and off.

18. The upright camera housing according to claim 1 further including a complementary upright illuminator housing with at least one illuminator with adjustable pan and tilt within the interior of said illuminator housing comprising;
an illuminator mount for installing said illuminator housing onto a vertical structure selected from a group consisting of a pole, column, post, pillar and a wall, wherein said illuminator mount can be attached by fasteners to said illuminator housing at its horizontal axis for enabling the adjustment and the locking of said housing pan position around said horizontal axis;
each said illuminator is attached by dual fasteners at its tilting axis to a panning frame and said panning frame is attached by a fastener at its panning axis of one side and by dual semi circle blocks at its panning axis of the opposite side to a support assembly;
said support assembly is mounted inside said illuminator housing and includes dual jaws each having cutout for accommodating said dual semi circle blocks and a vise screw for vising said dual semi circle blocks between said jaws;
said panning frame is cut open at its panning axis of said opposite side with each of the open cut is attached to one of said semi circle blocks, such that a whole circle block is introduced into said cutouts of said dual jaws, wherein said frame become loose around said illuminator and about its panning axis when said vise screw is released, thereby enabling to manually adjust the pan and tilt of said illuminator, and tightly locked onto said illuminator and about its panning axis when said vise screw is tightly vising said dual semi circle blocks between said jaws; and
an open window of said housing provides open accesses for said at least one illuminator and for manually adjusting the pan and tilt direction of said illuminator and for a driver to lock and unlock said vise screw.

19. The upright camera housing according to claim 18, wherein said illuminator mount is constructed for installing said illuminator housing inside said vertical structure.

20. The upright camera housing according to claim 18, wherein said illuminator is sealed for outdoor application.

21. The upright camera housing according to claim 18, wherein said illuminator housing is fabricated by a material and a process selected from a group consisting of molded plastic, extruded plastic, extruded aluminum pressed metal sheet and a combination thereof.

22. The upright camera housing according to claim 18, wherein said illuminator housing further, includes at least one light sensor and a switch for switching said illuminator on and off.

* * * * *